Aug. 13, 1957   J. F. CROSFIELD   2,802,666
REGISTER CONTROL SYSTEMS FOR MOVING WEBS
Filed Oct. 29, 1954   8 Sheets-Sheet 1

Inventor
John F. Crosfield
By Ralph B. Stewart
Attorney

Aug. 13, 1957　　　J. F. CROSFIELD　　　2,802,666
REGISTER CONTROL SYSTEMS FOR MOVING WEBS
Filed Oct. 29, 1954　　　8 Sheets-Sheet 7

Fig. 12

Inventor
John F. Crosfield
By Ralph B. Stewart
Attorney

Aug. 13, 1957    J. F. CROSFIELD    2,802,666
REGISTER CONTROL SYSTEMS FOR MOVING WEBS
Filed Oct. 29, 1954    8 Sheets-Sheet 8

Fig. 13

Inventor
John F. Crosfield
By Ralph B. Stewart
Attorney

United States Patent Office 2,802,666
Patented Aug. 13, 1957

2,802,666

REGISTER CONTROL SYSTEMS FOR MOVING WEBS

John Fothergill Crosfield, London, England, assignor to J. F. Crosfield Limited, London, England, a British company Application October 29, 1954, Serial No. 465,684

Claims priority, application Great Britain November 5, 1953

15 Claims. (Cl. 271—2.6)

This invention relates to systems for controlling register in machines for printing one or more impressions on a length of moving web, or for carrying out other operations on a web, such as cutting, embossing, and so on.

In such machines it is desirable, and in fact, essential in multicolour printing, that the successive impressions or other operations carried out on the web should be of constant lateral position relative to the edges of the web or, where more than one operation is to be carried out, it is desirable that the different operations should be in correct relative register both laterally and longitudinally. For example, in multicolour printing it is important that the different colours should be in exact registration. A method of ensuring longitudinal register in such a case is described in the specification of British Patent No. 641,830.

According to the invention, therefore, in a machine for performing one or more operations on a length of moving web, for example printing, embossing or cutting, pairs of indicating marks are made on the web in a fixed relationship to each of the operations performed, each pair of marks being of such a character that the distance between them measured in the direction of motion of the web varies with the distance from the edge of the web. Thus the time interval between the two marks passing a given point depends on the lateral position of the marks relative to that point. For example, the indicating marks may take the form of two non-parallel lines, one of which may be perpendicular to the direction of movement of the web. Alternatively, the indicating marks are formed by the leading and trailing edges respectively of a tapering or wedge-shaped marked printed on the web. They could even be the leading and trailing edges of a wedge-shaped aperture cut in the material of the web. Where longitudinal registration is also required, in the case of two or more operations on the web, the leading mark of the pair corresponding to each operation, or the leading edge of the wedge-shaped mark or aperture, may be perpendicular to the line of motion of the web, in which case a longitudinal register control of the type described in the specification of the above-mentioned British Patent No. 641,830 may be used.

The time interval between the pair of marks passing the given point may be measured by a photo-electric method. For example, a photo-electric cell receiving light reflected from a given point of the web will receive an impulse as the first indicating mark passes under the cell and another impulse as the second mark passes. If the web is disturbed laterally, the time interval between the impulses increases or decreases, and the change may be utilised to effect a correction, for example, by ultimately energizing a motor to move laterally one printing cylinder or to change slightly the inclination of a roller over which the web passes. Where the pair of indications are the leading and trailing edges of a printed mark, the photo-electric cell will receive a long pulse, the length of which depends on the lateral position of the mark relative to the cell as it passes the cell. This pulse may be electrically amplified and then integrated, for example by using it to charge a capacitor, and again its magnitude may be used to correct the lateral position of the web or of the operation when it departs from a predetermined value.

In particular where both longitudinal and lateral register control are required, a system of the type described in British patent specification No. 641,830 may be modified to give lateral control by the application of the system according to the present invention to the same photo-electric scanning head as that described therein. In one example of such a combined arrangement, for use with a four-colour printing press a pair of marks is printed simultaneously with each colour so that the four pairs of marks ultimately lie side by side across the web, and each pair consists of a leading mark perpendicular to the direction of movement of the web and a trailing mark inclined to the leading mark. When there is perfect longitudinal register the leading marks of any set of four corresponding pairs of marks will lie in line across the web. If, during the course of printing, the marks fall out of line, the mechanism described in the specification of British Patent No. 641,830 is brought into operation to provide longitudinal correction.

Normally, the middle points of the leading mark and of the trailing mark of each pair of marks will be made to pass a given scanning point. An error occurring in transverse register causes one pair of marks to move transversely with respect to the scanning point, and the time during which the pair of marks are passing the point is increased or decreased depending upon whether the distance between the two marks at the scanning point is then greater or less. Thus the alteration of the time duration between the two impulses corresponding to any colour is proportional to the amount of transverse register error in that colour.

A single scanning head may be provided for the two tracks of marks corresponding to two colours, and the resulting impulses from the two photocells contained in the scaninng head are employed to control the operation of the register correcting mechanism. This may be conveniently effected by employing the two sets of impulses corresponding to register marks in the two colours to control two circuits, each of which includes an integrating or storage condenser. In this way, a charge proportional or nearly proportional to the impulse time duration corresponding to each colour is obtained in each circuit. If transverse register error occurs, the difference between the two charges is employed to control the operation of the register correcting mechanism. This mechanism may comprise a reversible electric motor which is rotated in one direction or the other to correct the register error.

The impulses derived from the photo-electric cells are fed to amplifying stages incorporating "automatic volume control" as described in the specification of British Patent No. 641,830. Since it is sometimes necessary to place the register marks so that the scanning head associated with them has to scan the printed impression, provision is also made, for example, by employing a gating value for cutting off the circuits associated with such a scanning head when the printed impression is being scanned. Further, the charges on the two storage condensers may be periodically applied to a voltage comparator circuit as is also there described.

Thus the complete equipment for longitudinal and lateral register control may include a scanning head for scanning register marks of the kind referred to and as regards the longitudinal control, the apparatus may be generally similar to that set forth in the specification of British Patent No. 641,830 aforesaid except that in each channel, two pulses are set up. The electronic switch for rendering the circuits ineffective when printed or like matter is being scanned may, however, be replaced by an electromagnetic generator which produces a switch-on and a switch-off pulse during each revolution of the printing cylinder with the pulses connected so as to influence a gating valve which forms one stage in the amplifier and limiter circuit so that the circuits from that stage onwards are only operative during and about the times that the register marks are being scanned.

The circuit containing the photo-electric cells, the cathode followers, the A. V. C. amplifier and limiter may be common to both the longitudinal and lateral register control and in this case yields an output including two pulses per channel per revolution of the printing cylinders. By the use of flip-flop or trigger connected valves, a negative-going rectangular wave, is produced whose time-width is a measure of the lateral position of the register marks relatively to the spot of light used for the scanning.

For the longitudinal register control, each of these rectangular waves is fed to a differentiating circuit so that its leading edge appears as a negative-going pulse which is used for switching on or off, the valves of the trigger circuit which follows.

For the lateral register control each of the rectangular waves is integrated by passing it through a diode rectifier to a storage condenser connected in series with a high resistance across a high tension source so that the voltage across the charged condenser is a measure of the time between the scanning of the two register marks in the channel in question. The voltages across the condensers may be amplified and applied to a voltage comparator circuit similar to that provided for the longitudinal register control. The remainder of the lateral control circuits and the control of the correction motor may be similar to those provided for the longitudinal control and other features such as a time-cycling switch may be similarly incorporated.

In order that the invention may be more clearly understood and readily carried into effect, an example of a system in accordance with the invention providing both longitudinal and lateral register control will now be described in detail with reference to the accompanying drawings, in which.

Figure 1:
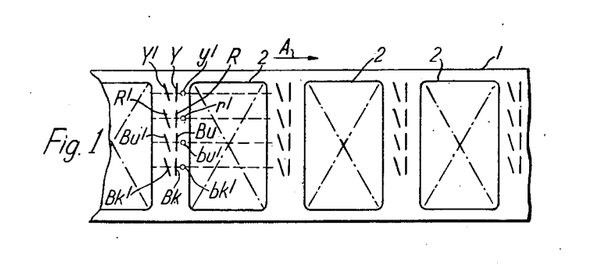
Figure 1 is a view of a length of the paper web illustrating the layout of register marks suitable for carrying out the invention and the method of scanning the register marks.
Figure 2:
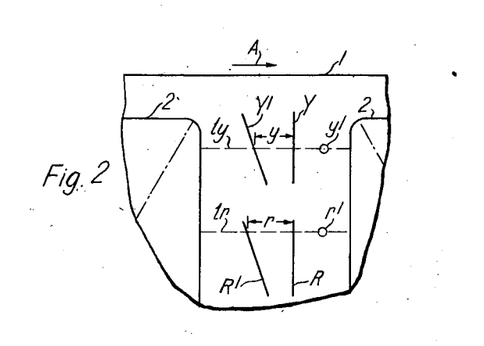
Figure 2 is a view corresponding to a part of Figure 1 to an enlarged scale for ease of explanation.

The principle employed in carrying out the invention may best be appreciated by consideration of Figures 1 and 2 which show the layout of register marks suitable for use in a four-colour printing press in which the four colours, yellow, red, blue and black are printed in succession by four printing cylinders. Each of these cylinders prints on the paper web 1 a pair of register marks at each revolution of the cylinder in a fixed relationship to the blocks of printed matter 2. The marks at Y, $Y^1$ for yellow, R, $R^1$ for red, B$u$, B$u^1$ for blue and B$k$, B$k^1$ for black are seen in Figure 1. The marks are printed in the gaps between successive blocks 2 of the printed matter in this example. Each of these pairs of marks, of course, move to the right as shown by arrows A as they are on the paper web 1. When they reach a certain point, each is scanned by a spot of light $y^1$, $r^1$ etc. and the light reflected from the paper web 1 is directed to affect a photo-electric cell which will be referred to below. The scanning head arrangements may be in general as described in the specification of British Patent No. 641,830.

In Figures 1 and 2, the longitudinal register is shown as correct since the four marks Y, R, B$u$ and B$k$ are all in line. However, if an error in longitudinal register occurs, the pulses from the photo-electric cells from any pair of marks Y, R etc. occur at different times and that effect is employed to control the longitudinal register largely as described in the said prior patent specification.

As regards control of the lateral register, the method employed can be best seen from Figure 2 which illustrates possible conditions for the red and yellow channels. In that figure, it may be assumed that the yellow channel marks Y, $Y^1$ appear in the correct position with respect to the lateral dimension of the paper web 1, but that the red channel has gone out of lateral register so that the register marks R, $R^1$, are printed further from the upper edge of the paper web 1. As a result of this the distance $y$ between the marks Y, $Y^1$ along the scanning line $ly$ has not changed but the distance $r$ between the marks R, $R^1$ along the scanning line $lr$ has increased. In fact, the distances $y$ and $r$ give a measure of the lateral positions of the respective register marks across the paper web 1. Consequently the difference between the distances $r$ and $y$ gives a measure of the error in lateral register of the yellow channel relatively to the red channel. It is this difference which is measured and utilised in the present system to control the lateral register. In a similar way, the blue channel lateral register may be corrected by comparison with the red channel and the black channel with the blue or as an alternative, the red, blue and black may each be compared with the yellow channel.

It will be apparent that to explain now the detailed operation of the system it is sufficient to describe the action of two channels as, for example, the yellow and red and in doing this, the channel of the colour printed first will be referred to as the slave channel and the second channel as the master channel.

Figure 3:
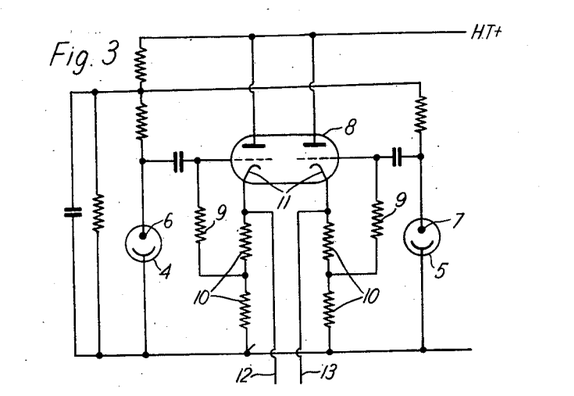
Figure 3 is a circuit diagram showing the connections at the scanning head.

When white paper is illuminated at the scanning head, maximum light is reflected on to the photo-electric cells 4, 5, shown in Figure 3 and maximum current flows in those cells. When the blocks of printed matter 2 or one of the register marks such as Y or R are illuminated, less light is reflected and the current in the respective cell 4 or 5 falls which causes the potential at the anode 6 or 7 of the cell to rise. In this way, a series of positive voltage pulses appear at these anodes corresponding to the longitudinal widths of the printed matter or register marks. As will be explained later, however, during the scanning of the blocks of printed matter 2, the circuits are rendered ineffective. The pulses are passed to two cathode-follower stages of a double triode 8, whose grids are biased through resistances 9 from tappings on the cathode resistances 10. Thus the pulses appear at the cathodes 11 of the valve 8 at low output impedance and are taken off through the conductors 12, 13 to the A. V. C. amplifier and gating circuit shown in Figure 4.

Figure 4:
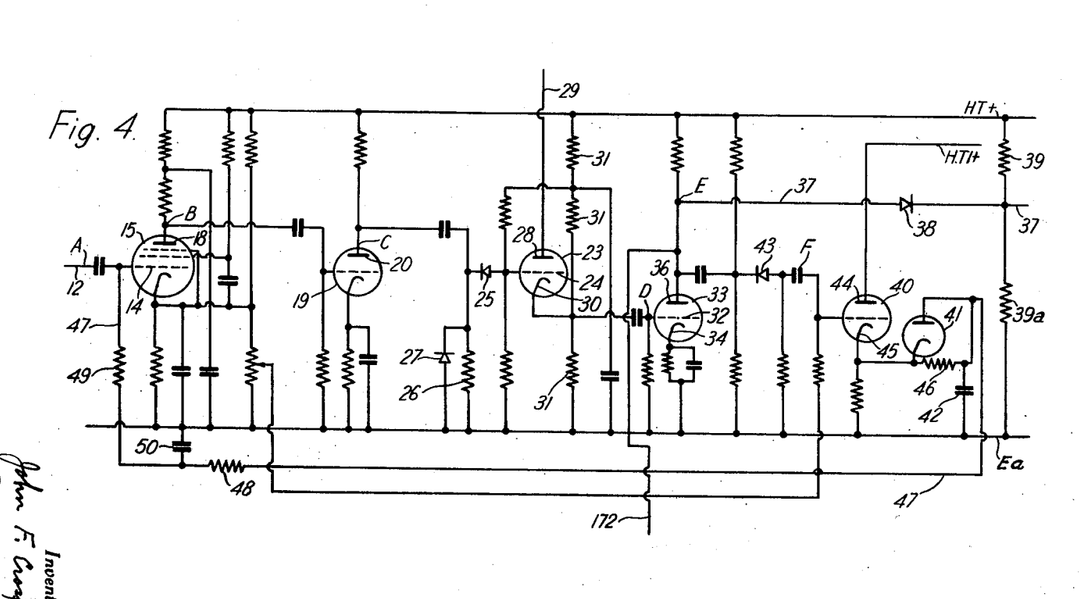
Figure 4 is a circuit diagram showing the connections of an electronic A. V. C., a gating and an amplifier circuit provided in each channel.

The circuit shown in Figure 3 is the same as the corresponding circuit in British patent specification No. 641,-830 and need not be further described here. The circuit shown in Figure 4 is provided for the same purpose as that in the said prior patent specification, but in the present case is modified in some respects. A circuit as shown in Figure 4 is provided for the master channel and a similar circuit for the slave channel.

The output from the scanning head, for example, that at the conductor 12 is applied to the control grid 14 of a variable mu pentode 15. The wave form of the input voltage at the point A is shown at A in Figure 5. The impulses due to the scanning of the blocks of printed matter 2 appear at 16 while the short pulses of small amplitude arising on scanning the register marks such as Y, Y¹ of one channel are seen at 17.

Figures 5, 6:
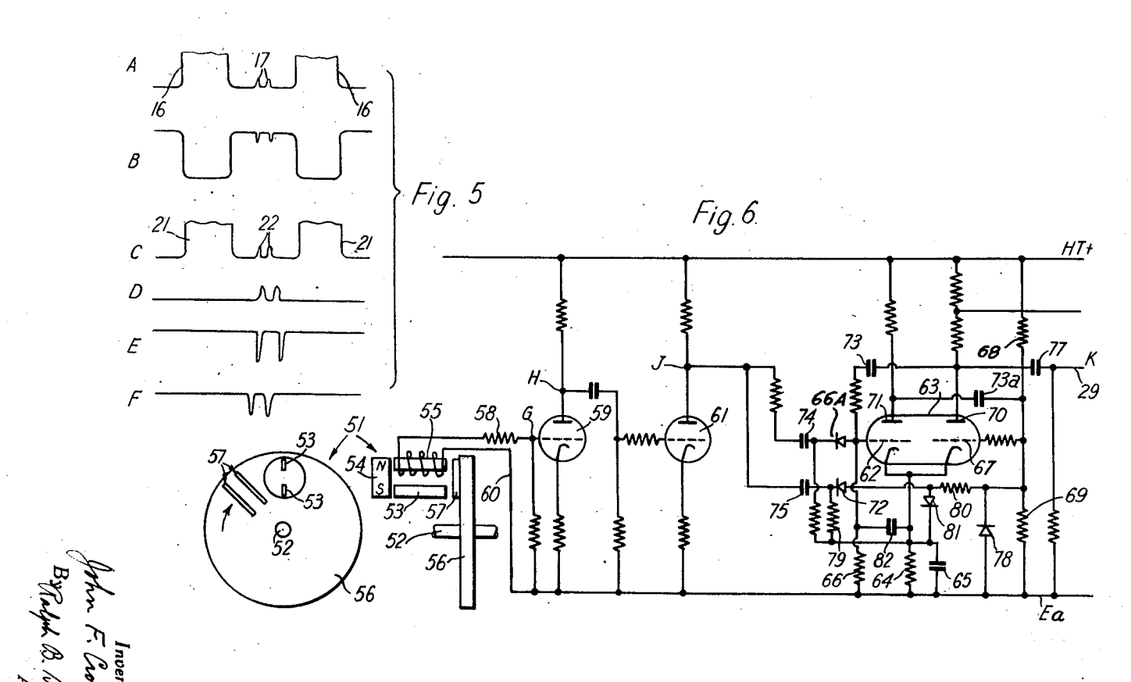
Figure 5 shows a series of wave-forms of the voltages at different points in Figure 4.
Figure 6 is a circuit diagram showing the connections of the magneto-electric switch.

After amplification by the valve 15, the potential at its anode 18 appearing at the point B has the wave-form shown at B in Figure 5. There is then a further stage of amplification by a triode 19, the voltage at the anode 20 of which has the wave form at the point C as shown at C in Fig. 5. The waves due to the printed matter are seen at 21 and the pulses from the register marks at 22. At this stage, the voltage 21 from the printed matter is eliminated by coupling the output of the valve 19 to another triode 23 connected to act as a gating valve. The output of the valve 19 is resistance-capacity coupled to the grid 24 of the gating valve 23 through a rectifier 25. The coupling resistance 26 is shunted by another rectifier 27 which is provided for the purpose of clamping the voltage wave at C to earth. The anode 28 of the gating valve 23 receives through a conductor 29, the switching potential from a magneto-electric generator driven in step with the printing cylinder in question as will be described in detail later. The result is that the gating valve 23 is only rendered conductive during the periods between the scanning of successive blocks of printed matter 2 so that only the impulses from the scanning of the register marks appear at the output of the gating valve 23. The bias voltage to the cathode 30 of the valve 23 is taken from a point in a potential dividing resistance 31 connected across the source of high tension supply between the positive line H. T.+ and the earth line E.

The cathode 30 is resistance-capacity coupled to the grid 32 of an output triode 33, the input to that grid at the point D having a wave-form as shown at D in Figure 5. The amplified output of the circuit is taken from the anode 36 of the valve 33 at the point E by the conductor 37 and its wave-form presenting the two pulses is seen at E in Figure 5. Further amplitude limitation of this output is furnished by a rectifier 38 in the conductor 37 and resistances 39, 39a connected between the conductor 37 and the high tension line H. T.+ and the earth line Ea respectively.

In order that the amplifier and gating circuits should operate at the correct input signal levels, it is necessary to maintain all the pulses at 37 of approximately the same amplitude and it is for that purpose that the A. V. C. and limiting arrangements are provided in the circuit. These arrangements consist of an A. V. C. delay and pulse lengthening circuit including a triode 40, a diode 41 and a storage condenser 42. The triode 40 is resistance-capacity coupled to the anode 36 of the valve 33 through a rectifier 43 so that its input at the point F has a waveform as shown at F in Figure 5. The anode 44 of the valve 40 is supplied from a high tension line H. T. 1+ and its output potential from the cathode 45 is applied to the diode 41 which permits negative pulses to charge the storage condenser 42 which, however, can slowly discharge through a high resistance 46. If the pulses at F tend to change in amplitude, therefore, the potential to which the condenser 42 is charged follows those changes. The potential of the condenser 42 is applied to the input grid 14 of the pentode 15 to exert the A. V. C. action through a conductor 47 in which there are resistances 48, 49 and which is connected to the earth line Ea through a condenser 50.

Figure 7:
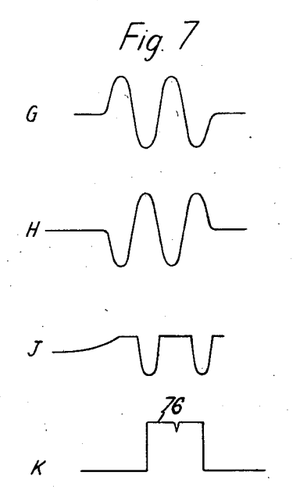
Figure 7 shows a series of wave-forms of the voltages at different points in Figure 6.

It is now convenient to describe in greater detail the arrangement of the magneto-electric switch with reference to Figures 6 and 7. This basically consists of a magneto-electric generator 51 which supplies the necessary pulses to the gating valve 23 and is shown very diagrammatically at the left of Figure 6, in side elevation and end elevation at 51. The shaft 52 of this small generator is driven in step with the printing cylinders preferably through gearing which does not introduce any back-lash. The generator has an armature normally stationary and fixed in the casing. This consists of two mild steel pole pieces 53 connected at their outer ends by a permanent magnet 54. One of these pole pieces bears a coil 55 which is, in effect, the armature winding at which the two pulses per revolution appear. This stator is mounted on a steel plate which is angularly adjustable in the casing about the shaft 52 so that the switching on and switching off pulses from the coil 55 can be made to occur at the desired instants which is normally immediately after a block of printed matter 2 has been scanned and immediately before the beginning of the scanning of the next block of printed matter 2. The central shaft 52 carries a steel disc 56 which has two radial pole pieces 57 mounted on it. At each revolution of the shaft 52, the two pole pieces 57 pass in sequence into registration with the stator pole-pieces 53 so as to close the magnetic circuit of the stator and thereby inducing the signal pulses in the coil 55. To enable the magnetic switch to be brought into step with the scanning head, the disc 56 is mounted on the shaft 52 so as to be capable of adjustment in steps of 15 degrees and the final adjustment is obtained by slightly turning the stator assembly as mentioned above. The winding 55 is connected at one end through a resistance 58 to the grid of a triode 59 and at the other end by a conductor 60 to the earth lead E. A second triode 61 provides a further stage of amplification. The wave-form of the output from the generator 51 at the point G is shown at G in Figure 7; the amplified output from the valve 59 at the point H is shown at H in Figure 7, and the amplified output from the valve 61 at the point J is shown at J in Figure 7.

This output is fed into both grids 62, 67 of a double triode 63 connected as an Eccles-Jordan trigger or flip-flop. This double triode has a common cathode resistance 64 heavily by-passed by a condenser 65. The left hand grid 62 is held at earth potential through a resistance 66, but the right hand grid 67 is held at a positive potential by resistances 68, 69. Therefore, the right hand triode normally conducts sufficient current to cut off the left hand triode which is the stable state of the circuit. The anodes 70 and 71 are coupled with the opposite grids 62, 67 to produce rapid switching of the current between the two triodes. The first negative pulse from the generator 51 is applied to both grids 62 and 67 through the rectifiers 66a and 72. However, as in the normal state, the anode 71 is cut off, the negative pulse on the grid 62 does not disturb the stable state. On the other hand, the negative pulse on the grid 67 reduces the current to the anode 70 and raises the potential of that anode. The coupling through the condenser 73 causes the potential of the grid 62 to be raised sufficiently to start current passing to the left hand anode 71. This effect is cumulative and current is transferred to the left hand anode 71 rapidly from the right hand anode 70. The grid 62 is now held at positive potential by a condenser 73 and the right hand grid 67 is held approximately at earth potential by a condenser 73a, so that the left hand anode 71 continues to conduct. This would continue until the condensers 73 and 73a have discharged when the double triode 63 will return to the original stable state. However, normally the second pulse from the generator 51 is applied to both of the grids 62 and 67 before this happens and the circuit tips over and returns to the stable state. The result is that a square pulse is produced at the right hand anode 70 as indicated at 76 at K in Figure 7 which is coupled by a condenser 77 through the conductor 29 to the anode 28 of the gating valve 23 shown in Figure 4. The result is that this valve 23 is operative for the time period between the two pole pieces 57 passing in front of the pole-pieces 53 of the stator of the generator 51.

The rectifiers 66a and 72 in Figure 6 prevent signals being fed back from the anodes 71 and 70 to the corresponding grids, whereas a rectifier 78 prevents the right hand grid 67 from becoming very negative at the instant of the switching-on pulse. The condenser 75, resistance 79 and rectifier 72 are arranged so that the time constant of discharge of the condenser 75 is long relatively to its time constant of charge. The negative pulses from the valve 61 build up a blocking voltage across the condenser 75 proportional to the amplitudes of the pulses so that only their peaks are allowed to pass and thus smaller pulses which may be picked up are eliminated. The resistance 80 and rectifier 81 by-pass the large pulses at the grid 67 and prevent them interfering with the blocking action just described. A condenser 82 is provided to improve the range of useful operation at high speeds.

Figure 8:
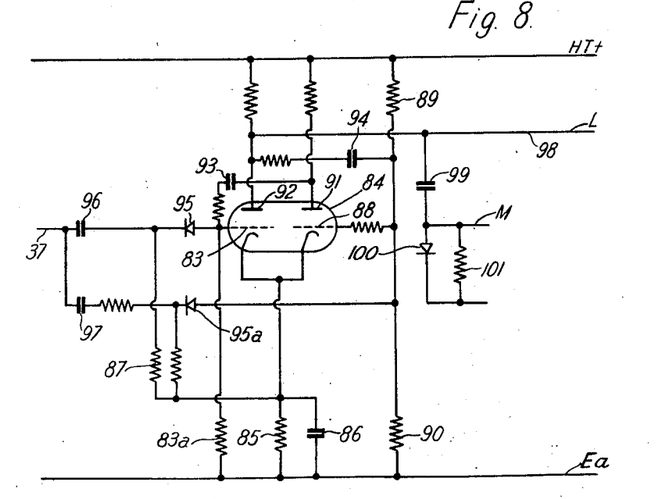
Figure 8 is a diagram of the connections of the Eccles-Jordan trigger circuit provided in each channel for producing the inputs to the trigger and integrating circuits for control of the longitudinal and lateral register.

It has already been explained that the output from the A. V. C., gating and amplifier valve circuit shown in Figure 4 consists of two pulses per revolution of the printing cylinder for each colour as shown at E in Figure 5. The input required for the trigger and integrator in each channel for control of longitudinal register, however, consists of one pulse per revolution corresponding to the first register marks R, Y, B*u* or B*k* (Fig. 1) while for the control of lateral register an input per revolution is required consisting of one negative-going rectangular wave whose time-width is a measure of the distance r in Fig. 2 and for the other channel, a similar rectangular wave whose time-width is a measure of the distance y. In order to obtain these inputs for the subsequent circuits, the output from the point E in Fig. 4 is fed by the conductor 37 to an Eccles-Jordan trigger circuit which is shown in Fig. 8.

The conductor 37 impresses this output voltage on the left hand grid 83 of a double triode 84 which has a common cathode resistance 85 heavily by-passed by a condenser 86. When no pulses are arriving, the left-hand grid 83 is held at earth potential through a resistance 83a; the right hand grid 88 is held at a positive potential by resistances 89, 90. Therefore, in the normal state of the circuit, the right hand triode passes sufficient current to cut off the left hand triode by the coupling of the cathodes. When the first negative pulse, corresponding say to the register mark Y (Fig. 2) arrives, it is applied to both of the grids 83, 88 through rectifiers 95, 95a. However, as the anode 92 is cut off in the normal state of the circuit, the negative pulse on the grid 83 does not disturb that state. However, the negative pulse on the grid 88 depresses the potential on that grid and raises the potential of the anode 91 and current now flows at the left hand anode 92. The grid 83 is held positive by a condenser 93 and the grid 88 is held negative by a condenser 94. This state of affairs would continue until the condensers 93, 94 have time to discharge, but before that can happen, the next negative signal pulse, say that corresponding to the register mark Y¹, arrives and is applied to both grids 83, 88 which results in the circuit being returned to its normal state.

Figure 9:
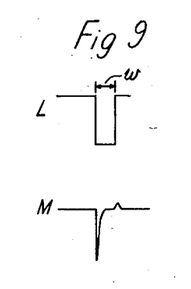
Figure 9 shows the wave-forms of the voltages at two points in Figure 8.

This action results in a rectangular wave of potential being set up at the anode 92 and at the point L in the conductor 98 as shown at L in Fig. 9. The time width w of that wave is, of course, a measure of the distance y or r between the two register marks in one channel measured along the scanning line l*y* or l*r* in Fig. 2. That is what is required for supplying to the subsequent lateral register control circuits.

Each of the rectangular waves in the master and slave channels respectively is fed through a differentiating circuit comprising a condenser 99, a rectifier 100 and a parallel resistance 101 so that its leading edge appears as a negative-going pulse at the point M as shown at M in Fig. 9 which is what is required to supply the trigger circuits for the longitudinal register control.

The remaining circuits for the latter control will now be described in detail.

Figure 10:
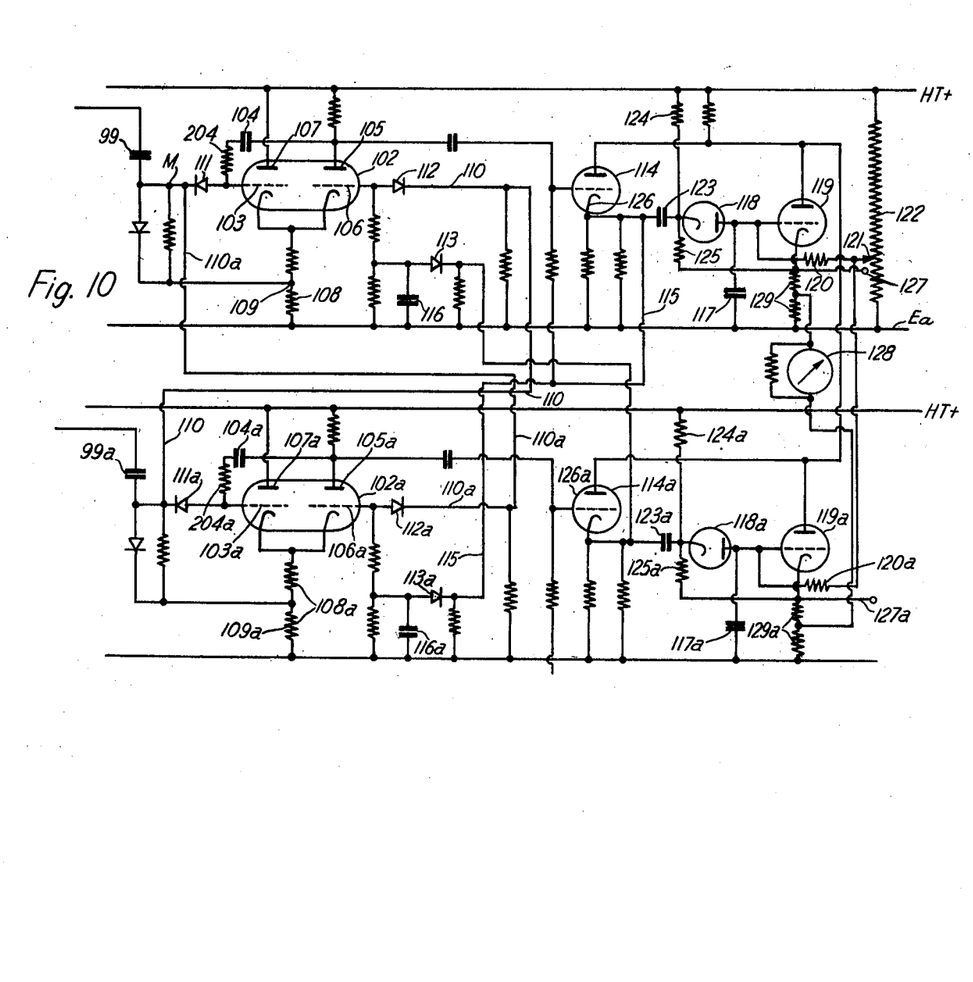
Figure 10 is a diagram of connections of the trigger circuits and error integrating circuits for both of the channels.

In Fig. 10 are shown the connections of a pair of trigger circuits and error integrator circuits. In describing the operation, the upper circuit containing the double triode trigger valve 102 will be referred to as the slave channel, and the lower circuit containing the double triode 102a will be referred to as the master channel. The purpose of the trigger valve 102 or 102a is to establish a negative rectangular pulse whose width corresponds to the longitudinal register error. Each of the valves 102 and 102a is a double triode having its left hand grid 103 coupled by a condenser 104 through a resistance 204 to its right hand anode 105 to ensure rapid transfer of current from one anode to the other. The upper circuit will be described, but the lower circuit is the same and its parts bear the same numerals as the upper circuit, but with the suffix a in each case. The right hand grid 106 is not coupled to the left hand anode 107, but the coupling is introduced by employing a common cathode resistance 108. The left hand grid 103 is biassed from a tapping 109 on the cathode resistance 108 while the right hand grid 106 is normally at earth potential so that the left hand anode 107 normally passes sufficient current to cut off the right hand anode 105.

Only the trigger in one channel can operate at any one time and that is in the channel whose register mark appears first. Assume that in the case to be considered there is a longitudinal register error such that the first impulse appears in the slave channel, thus when the signal impulse is received from the point M in the upper or slave channel, the grid 103 is made negative which reduces the current at the anode 107 sufficiently to make the anode 105 conduct. The potential at the anode 105 falls and thus the potential at the grid 103 is made still more negative. The effect is cumulative and the grid 103 is held negative by the condenser 104. If no further signal follows, these conditions would continue until the condenser 104 discharged when the circuit would tip over and return to its normal state. However, before this has had time to happen the switch-off pulse arrives from the master channel by way of the conductor 110 and the negative pulse is impressed on the right hand grid 106 and the current is switched back to the left hand anode 107. Thus a negative rectangular wave has been set up at the anode 105 and its time-width is proportional to the distance between the leading register marks in the slave and master channels and thus to the longitudinal register error. No more pulses are applied to the slave trigger which thus remains switched off until the next set of register marks is scanned during the next revolution of the printing cylinder.

As regards the master trigger circuit, it receives its first signal pulse from the slave circuit by way of the conductor 110a to its right hand grid 106a and that is the normal switch-off pulse for the master channel. Nothing happens, however, for the master channel has not been switched on and the right hand anode 105a is already cut off. The next pulse received by the master trigger valve 102a is the switch-on pulse to the left hand grid 103a. Means are, however, provided for preventing this pulse switching on the master valve 102a by sending a blocking signal in the manner which will be described later. Since no more signals are received by the master trigger circuit, it is not switched on at all On the other hand, if the master register mark arrives before the slave mark, the master trigger circuit would operate as already described and the slave trigger circuit would remain blocked.

A rectifier 111 is provided to admit the switch-on pulses but to keep the feed-back from the anode 105 to the grid 103 out of the switch-on circuit so that the low impedance of the latter circuit cannot reduce the feedback pulse. Another rectifier 112 admits the switch-off pulse to the grid 106, but keeps the blocking pulse out of the switch-off circuit. Yet another rectifier 113 allows the blocking pulse to pass but keeps the switch-off pulse out of the blocking circuit.

The negative rectangular pulse at the anode 105 is fed into a cathode-follower triode 114 which provides the blocking signal already mentioned in the form of a similar negative pulse of low output impedance in its cathode circuit. Thus the triode 114 in the slave channel applies the blocking signal to the master channel through the conductor 115 and rectifier 113a to the right hand grid 106a of the double triode 102a to prevent the latter being operated by the switch-on pulse received at its grid 103a. This blocking signal is lengthened by the rectifier 113a and a condenser 116a so that it is continued until any switch-on pulse has become too small to operate the trigger valve 102a.

The error integrating circuit includes a storage condenser 117, a diode 118 and a further cathode-follower triode 119. The storage condenser 117 is normally charged to a predetermined voltage, say 28 volts, through a resistance 120 from a tapping 121 in a potential-dividing resistance 122 connected between the high tension line HT+ and the earth line E. This voltage is also applied to the grid of the triode 119 and to the anode of the diode 118. Thus when the error pulse appears at the cathode of the triode 114, the cathode potential of the diode 118 falls sufficiently to allow the diode 118 to pass current. The storage condenser 117 then discharges through the diode 118 and condenser 123 for a period of time determined by the time-width of the error pulse and is recharged through the resistance 120 during the intervals between the error pulses. The average direct current potential across the storage condenser 117 falls by an amount corresponding to the error in longitudinal register. Resistances 124 and 125 hold the cathode of the diode 118 at a voltage, say 13 volts, more positive than its anode. The diode is blocked to small negative pulses because the switch-on pulses applied to whichever trigger valve does not operate will pass through the feedback impedance 204, 104 to the grid of the cathode-follower triode 114 and small negative pulses will appear at its cathode 126. The blocking voltage on the diode 118 prevents these small pulses from penetrating into the error integrating circuit. The voltage across the storage condenser 117 will pulsate to an extent depending on the speed at which the paper web 1 travels past the scanning point, but the average direct current voltage across the condenser is independent of that speed since when the web travels faster and the condenser 117 has less time to discharge, it has correspondingly less time to be charged again.

The cathode-follower triode 119 has normally a cathode potential of say 30 volts. When, however, there is an error and the voltage across the condenser 117 falls, the triode 119 gives a corresponding direct current voltage of low output impedance.

The output from the error-integrating circuit is taken out from the cathodes of the triodes 119, 119a by the conductors 127, 127a. When there is no error, the voltage at one of them will fall depending on the direction of error. The indicating meter 128 is connected between tappings in the cathode resistances 129, 129a of the valves 119, 119a in the respective channels.

Figure 11:
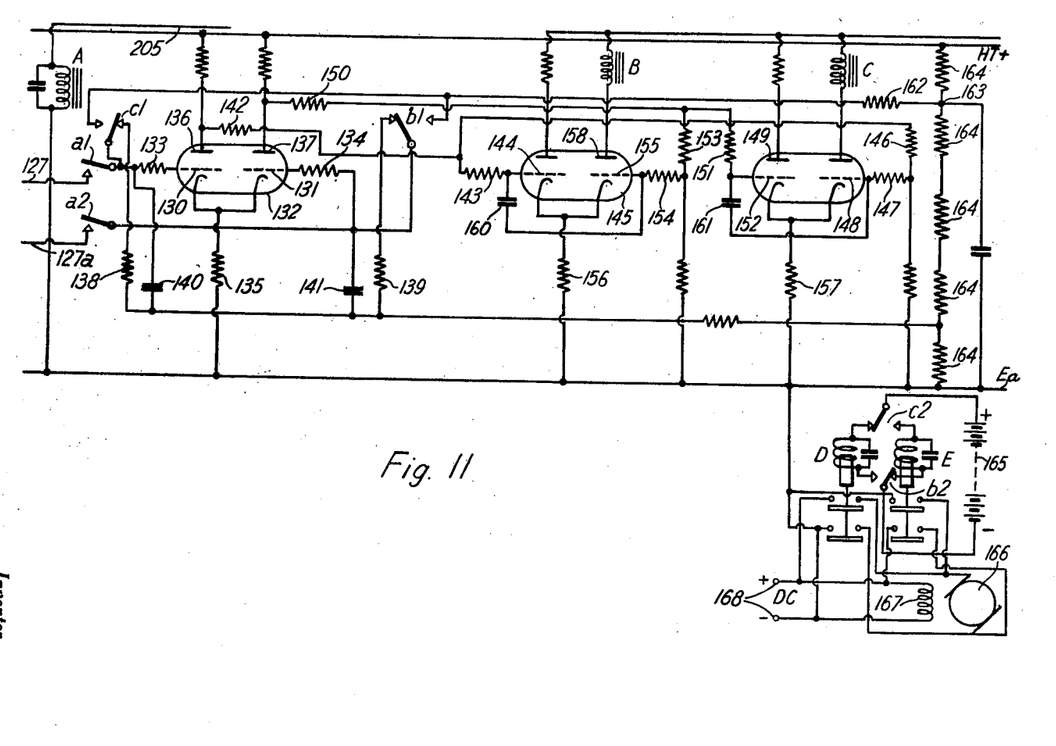
Figure 11 is a circuit diagram of the voltage comparator and of the contactor switches which control the register correction motor.

The two output conductors 127, 127a are connected momentarily at predetermined time intervals to a so-called voltage comparator circuit, the connections of which are shown in Fig. 11 and which also shows the circuits of the contactor switches which control the electric motor provided for correcting errors in longitudinal register. The connection of the conductors 127, 127a is effected by a so-called time cycling switch circuit which will be described in detail later.

In Fig. 11, the conductors 127, 127a are respectively connected periodically to the grids 130, 131 of a double triode 132 through resistances 133, 134 by the first two contacts a1, a2 of a relay A which is energised at the requisite instants. The valve 132 is balanced with a common cathode resistance 135 and its two halves are connected symmetrically. Its two anodes 136, 137 are normally at the same potential.

Assume that there is a longitudinal register error, such that the slave trigger circuit shown in the upper part of Fig. 10 is operating. The outputs in the conductors 127, 127a from the integrator circuits are unbalanced, the output from the conductor 127a being at a predetermined voltage, say 30 volts, and that from the conductor 127 being at a lower voltage. Before the relay A closes its contacts a1, a2, all the relay contacts are as shown in Fig. 11. When the relay A is energised, however, since the output impedances of the circuits shown in Fig. 10 are small compared with the resistances 138, 139 which are at present connected to the grids 130, 131, these grids become unbalanced, the grid 130 going negative. In Fig. 11, the difference between the voltage of the grids is also connected across a pair of condensers 140, 141 connected in series. However, without altering the action of the circuit, one condenser connected across the movable centre contacts c1 and b1 may replace these two condensers.

It will now be noted that the left hand anode 136 of the valve 132 is connected through resistances 142 and 143 to the left hand grid 144 which, for example, may be at 109 volts, of a further double triode 145 and through resistances 142, 146 and 147 to the right hand grid 148 of yet another double triode 149 while the right hand anode 137 of the valve 132 is connected through resistances 150, 151 to the left hand grid 152 of the valve 149 and through resistances 150, 153 and 154 to the right hand grid 155 of the valve 145. The valves 145, 149 have common cathode resistances 156, 157 respectively and the relays B and C are connected as the anode load of the respective right hand halves of the triodes 135, 149. Thus, if, for example, the left hand half of the triode 145 is conducting, the right hand half is cut off and no current flows through the winding of the relay B. When the triode 132 becomes unbalanced if the left hand anode 136 falls in potential and the right hand anode 137 becomes more positive, the potentials at the grids 144, 155 of the triode 145 change in such a way as to make the voltage of the right hand anode 158 fall. With the connections between the valves 132, 145 and 149 as described above, the result is that when the relay B is energised, the relay C is further cut off and vice-versa. Condensers 160, 161 are provided connected respectively between the grids 144, 155 of the triode 145 and between the grids 152, 148 of the triode 149 to prevent low frequency oscillation when the equipment is first switched on.

When the relay C is energised and closes its contact c1, on the normally open side which is the right hand side in Fig. 11, the whole of the difference between the voltages at the grids 130, 131 is applied to the condenser 140 which is then charged through the resistance 139 and contact b1. The relay contacts a1, a2 now open, but the voltage difference is now maintained at the grids 130, 131 by the charge in the condenser 140. Thus when the relay C is energised a few milliseconds after the closing of relay A, the condenser 140 is charged; it is then slowly discharged through the relay contact c1 on the normally open side and a resistance 162 by the potential of, say, 90 volts at the tapping point 163 in a potential divider 164 connected between the HT+ line, at say 200 volts and the earth line E. In addition, the contactor E is energised, being connected across a source of potential 165 by the relay contact c2 on its normally open side which is the right hand side in Fig. 11.

As shown, the contactors D, E have their windings controlled by the relay contacts b2, c2 so that in the normal condition as shown, neither is energised from the source of supply 165. If relay C is energised, as already mentioned, the contactor E pulls up and it can be seen that if the relay B is energised, the contactor D closes its contacts. The correcting motor 166 is shown as a direct current motor with its field winding 167 permanently connected across a source of supply 168 and its armature reversed or cut off by the contactors D, E. In practice, however, the motor may be a 3-phase motor with one phase of its stator winding permanently connected to the source of supply and the other two phases reversed when the contactors change over to reverse the direction of rotation of the motor. Contactors with three sets of contacts each, could clearly be used if it is desired to have the motor completely disconnected when the contactors open their contacts.

Figure 12:
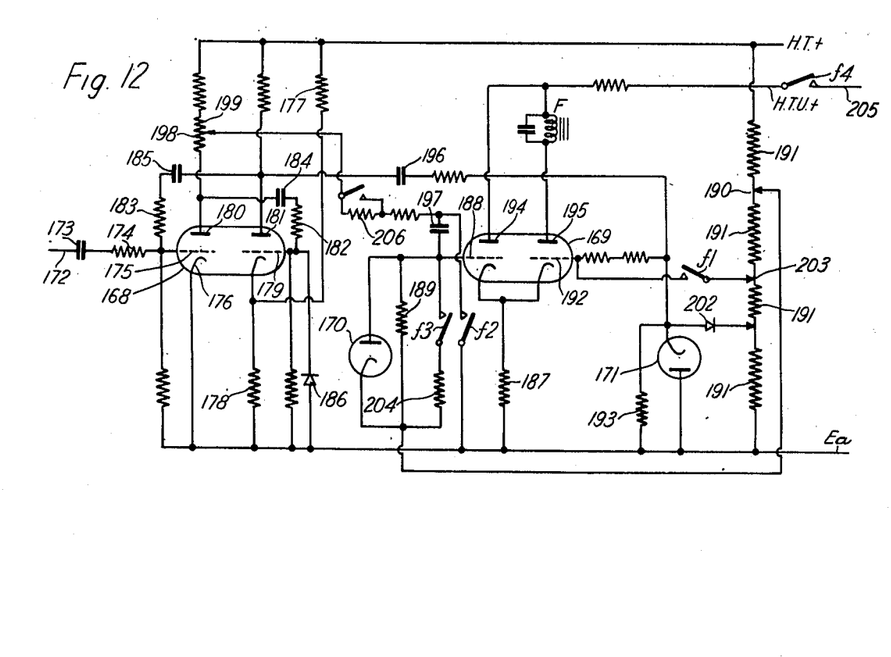
Figure 12 is a diagram of the connections of a circuit referred to as the time-cycling circuit.

The time-cycling circuit already referred to is shown in Fig. 12. It serves two purposes, first, to energise the relay A in Fig. 11 to connect the circuit shown in Fig. 11 to the integrating circuits shown in Fig. 10 for a short time after a predetermined number of revolutions of the press as already mentioned, and secondly, to ensure that those circuits are only connected when the press is running above a certain speed since it is undesirable for the connection to be made when the press is running slowly while joins in the paper web 1 are passing through. Owing to the elasticity of the paper, a delay in time occurs before an adjustment of the longitudinal register mechanism can actually take effect and cause a change in register on the printed paper, which delay may amount to several seconds. It is found that it corresponds roughly to a fixed number of revolutions of the printing cylinders. For that reason, the register error is measured once in each revolution, but corrections are made only at intervals of several revolutions. If a correction were made at each revolution, overcorrection would be effected and continuous hunting would occur. Thus the valves 168, 169, 170 and 171 in Fig. 12 are connected so as to cause the relay A (Fig. 11) to be energised at intervals corresponding to a definite number of revolutions of the printing cylinders.

The valve 168 is a double triode connected as a flip-flop stage, which is triggered by the negative impulses from the anode 36 of the output triode 33 in Fig. 4—see E in Fig. 5. These impulses are carried by the conductor 172 by way of condenser 173 and resistance 174 to the left-hand grid 175 of the valve 168. This left-hand half of the valve is normally conducting since its grid 175 and cathode 176 are at earth potential. The right-hand half is normally blocked since its cathode is held at positive potential by resistances 177 and 178 while its grid 179 is at earth potential. The anodes 180, 181 are cross-connected to the opposite grids 179, 175 through resistances 182, 183 and condensers 184, 185. When the grid 175 receives a negative signal, the current at the anode 180 is reduced. Thus the potential at the grid 179 is made more positive and the anode 181 caused to conduct. The negative signal on the anode 181 is fed back to the grid 175 so that the current is immediately transferred to the right-hand half of the valve and the left-hand anode 180 is blocked. This continues until the condensers 184, 185 become charged up when the valve falls back to its normal state. A rectifier 186 is provided to prevent the grid 179 from going very negative at this time and to prepare the circuit for the next signal. Thus every time a negative signal is applied to the grid 175 during each revolution of the printing cylinders, a positive rectangular pulse is set up at the anode 180 and a similar negative pulse at the anode 181.

The next valve 169 is another double triode with a common cathode resistance 187. Its left-hand grid 188 is connected through a resistance 189 to a tapping point 190 in a potential dividing resistance 191 connected between a stabilised high tension line HT+, of, for example, 200 volts and the earth line E, and the grid 188 is therefore normally at a positive potential of, say, 85 volts while the right-hand grid 192 is connected to earth through a resistance 193. Thus the left-hand anode 194 is normally conducting while the right-hand anode 195 is cut off. Thus the winding of the relay F which is in the circuit of the anode 195 is receiving no current.

A storage condenser 196 connected to the anode 181 of the valve 168 and a storage condenser 197 are charged up by a given voltage each time the triode 168 is triggered. The plate of the condenser 197 which is connected to the grid 188 of the valve 169 is charged positively to 85 volts from the tapping 190, its other plate being held at 60 to 130 volts depending on the setting of a tapping 198 on a resistance 199 in the circuit of the anode 180 of valve 168. When a positive signal appears at the anode 180 of valve 168, the diode 170, which is normally non-conducting, conducts for the duration of the signal causing a positive charge to build upon the upper plate of the condenser 197. During intervals between signals, this charge partly leaks away through the resistance 189, and the grid 188 of the valve 169 is held negative relatively to the tapping point 190. In fact, each time the triode 168 is triggered, the grid 188 of valve 169 becomes progressively more negative in potential, and since the anode 195 is not passing current, the connected cathodes 200, 201 follow the grid 188 and become negative.

The plate of the condenser 196 connected to the anode 181 is normally at 200 volts from the line HT+ while its other plate is connected to earth through the resistance 193. When a negative signal appears at the anode 181 of the valve 168, the diode 171, which is normally non-conducting, conducts for the duration of that signal so that a positive charge is built up on the plate of the condenser 196 connected to the grid 192 of the valve 169. During intervals between signals, this charge partly leaks away through the resistance 193, and the grid 192 of the valve 169 goes positive with respect to earth. Each time the triode 168 is triggered, the grid 192 becomes progressively more positive but a rectifier 202 is provided to prevent it going too positive; for example, beyond 39 volts. The reason for this is that at corresponding low speeds, the grid 188 of the valve 169 never goes sufficiently negative for the relay F to operate due to the leak through the resistance 189. When the cathodes of the valve 169 go sufficiently negative, the anode 195 begins to pass current and the relay F starts to operate.

Its contact f1 closes first and it connects the grid 192 of the triode 169 to a tapping 203 say at 76 volts in the potential divider resistance 191, thus increasing the current through the relay F and causing it to close its contacts firmly. Then its contact f2 closes and earths the upper plate of the condenser 197 and thus makes the grid 188 very negative so that the anode 194 is not passing current. Then the relay contact f3 closes and recharges the condenser 197 through a resistance 204 to bring the grid 188 up to 85 volts again after a fraction of a second, and the relay F opens its contact. Meanwhile, the relay contact f4 energises the relay A (Fig. 11) by connecting the unstabilised high tension line HTU+ through a conductor 205 to the winding of the relay A. When the relay F returns its contacts, the condenser 197 which is positively charged, discharges to its original potential through the diode 170. The condenser 196 remains charged at its original level which is 39 volts in the example considered. Coarse and fine adjustments of the frequency of connecting the circuits are provided. Thus by switching the resistance 206 in or out of circuit, the charge built up on the condenser 197 at each signal is set and by varying the setting of the tapping 198, the voltage applied to the condenser 197 and therefore its charge can also be adjusted. By these controls, it is possible to alter the number of revolutions before the relay A is operated from 5 to 30 and thereby obtain the optimum frequency of operation.

Figure 13:
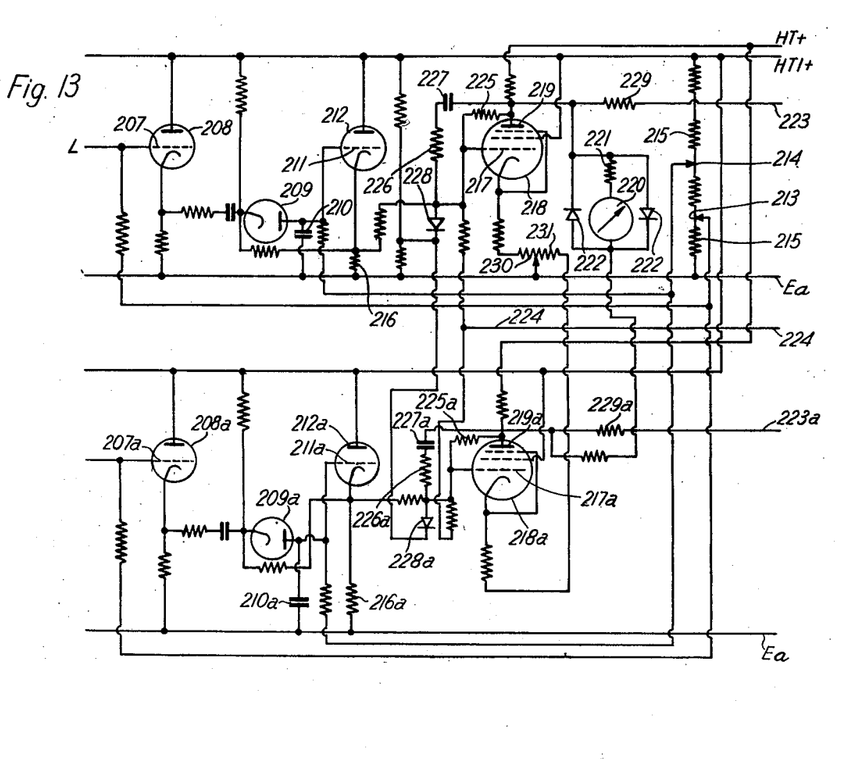
Figure 13 shows the connections of the integrating and amplifying circuits for the lateral register control in both channels.

It is now convenient to deal with the remainder of the circuits concerned with the control of lateral register. Referring then to Fig. 13, the rectangular waves of timewidths corresponding to the distances y and r in Figure 2 and appearing at the conductors 98 of the two channels (Fig. 8) are applied to the grids 207, 207a, of a pair of triodes 208, 208a connected as cathode-follower amplifiers. It is assumed that the upper circuit in Fig. 13 is in the slave channel and the lower circuit is in the master channel. The upper circuit will now be described in detail but the lower circuit is marked with corresponding reference numerals with the suffix a added in each case so that its mode of connection will be understood. After amplification in the triode 208, the rectangular waves are integrated by being passed through a diode 209 which conducts when the cathode of the valve 208 is at negative potential to charge a storage condenser 210. As the rectangular waves are of constant amplitude, the amount of the charge in the condenser 210 is proportional to the time-width of the wave as is also therefore the voltage to which that condenser is charged. That voltage is applied to the grid 211 of a second triode 212 connected as a cathode follower. The grids of the cathode follower valves 208 and 212 are biassed positively from respective tappings 213, 214 in a potential dividing resistance 215 connected between a high tension line H. T. 1+, for example at 200 volts and the earth line E. The positive line H. T. 1+ supplies the anodes of the triodes 208, 212. The output from the cathode resistance 216 of the triode 212 is applied to the control grid 217 of an output pentode 218, which control grid is biassed negatively, say, to −75 volts through the conductor 224 so that the pentode operates as a direct current amplifier. Thus the direct current voltage outputs at the anodes 219, 219a of the two pentodes 218, 218a correspond to the distances y and r in Figure 2, and can vary continuously and proportionally from the value corresponding to those distances at the end where the two marks Y, Y¹ or R, R¹ are closest together to the value corresponding to the distance at the other end where the marks are furthest apart. The volts change per unit of lateral register error, that is the volts change between the anodes 219, 219a is arranged to be of the same order as the volts change per unit of longitudinal register-error, that is, between the cathodes of the valves 119, 119a in Fig. 10. Thus the lateral error meter 220 in series with a resistance 221 both shunted by reverse-connected rectifiers 222 is connected between the two anodes 219, 219a, from which also the output conductors 223, 223a are taken.

Alternating current negative feed back from the anode 219 of the pentode 218 to the grid 217 in the form of resistances 225, 226 and a condenser 227 is provided to reduce ripple superposed on the output direct current voltage. A small rectifier 228 at the grid 217 prevents the grid 217 going too positive when the paper web 1 is stationary which otherwise would overrun the pentode 218. The resistance 229 in the output conductor 223 is provided to prevent the pointer of the error meter 220 from kicking when the time cycling relay corresponding to the relay A in Fig. 11 closes. The potentiometer 230 connected between the cathode of the pentodes 218, 218a and connected to the earth line E at the adjustable tapping 231 is provided to enable any unbalance in the preceding stages due to tolerance permitted in the values of the circuit components to be corrected. Otherwise any such unbalance is amplified and would appear with a large amplitude at the output conductors 223, 223a.

These conductors may be then connected to a voltage comparator circuit and contactor circuit for the lateral control motor in the position of the input conductors 127, 127a in Fig. 11 and the circuit may take a similar form to that shown in that figure. While, however, the motor 166, 167 for longitudinal register control corrects longitudinal error, for example by the adjusting the length of the paper web between two consecutive printing cylinders or by angularly adjusting one cylinder relatively to the other, lateral error may be corrected by moving the printing cylinders axially. In practice the last cylinder is generally kept in a fixed axial position.

Finally, other features of the longitudinal register mechanism may be used with the control of lateral register including a time-cycling circuit as shown in Fig. 12.

I claim:

1. A system for controlling the lateral position or register of a moving web on which one or more operations are to be performed, comprising a plurality of pairs of register indicia employed for the control impressed on the web at locations spaced along the length of the web, each pair being located in a fixed relationship to each of the operations performed and the two parts of each pair being of a character such that the distance between the two parts measured in the direction of motion of the web varies with the distance from the edge of the web, so that the time interval between the two indicia parts passing a given point gives a measure of the lateral position of the operation in question relative to that point, scanning means for scanning the track of each pair of indicia and means for establishing a controlling pulse upon the scanning of each of said indicia.

2. A system according to claim 1, wherein each pair of indicia comprises the leading and trailing edges of a wedge shaped defined area on said web.

3. A system according to claim 1, wherein each pair of indicia comprises the leading and trailing edges of a wedge shaped or embossed impression on said web.

4. A system according to claim 2, wherein the leading edge of the area or impression is perpendicular to the line of motion of the web and is used to give a measure of the longitudinal register of the operation.

5. A system according to claim 4, wherein at least two operations are to be performed on the web and the relative longitudinal register of the operation is determined by the time interval between the passing of two leading edges past a given fixed transverse line.

6. A system according to claim 1 for controlling the lateral register in printing on the web in at least two colours, wherein the register indicia associated with each colour move during the printing along a track, means for projecting a spot of light to scan said track, a photoelectric cell so disposed as to be influenced by the light reflected from the moving web and electronic circuits connected to said photo-electric cell and designed to yield an output which is a measure of the distance apart of the two register indicia at said scanning track.

7. A system according to claim 6, wherein pulses set up in the photo-electric cell are applied to an electronic amplifier and gating circuit which is common both to the longitudinal and lateral register circuits and yields an output consisting of two pulses corresponding to the two register indicia scanned during each revolution of the printing cylinder.

8. A system according to claim 7, wherein the output from the electronic amplifier and gating circuit is differentiated in a further electronic stage and the leading edge of the differentiated output is used as the register pulse in the subsequent circuits for the longitudinal register control.

9. A system according to claim 7, wherein the output from the electronic amplifier and gating circuit is applied to an electronic trigger or flip-flop stage which yields rectangular waves having time-widths which are measures of the distance apart of the two register indicia of successive pairs, and the said rectangular waves are integrated in a circuit including a diode rectifier and a storage condenser to produce voltages which are also measures of the said distances and are used as the register voltages in the subsequent circuits for the lateral register control.

10. A system according to claim 7 wherein said gating circuit includes an electronic discharge tube which is controlled by pulses produced by an electromagnetic generator driven in step with the printing cylinders so that it is operative only during the portions of each revolution of the printing cylinder corresponding to the lengths of the web bearing the register indicia.

11. In a system for controlling the lateral register of a moving web, the combination of register markings impressed on said web at locations spaced along the length thereof, each marking being applied over an area of said web which varies in length, as measured in the direction of movement of said web, as the area approaches the edge of the web, a scanner for scanning said web at a fixed point to scan said marking in succession, and means controlled by said scanner for producing voltage pulses of durations proportional respectively to the lengths of the scanning paths of said markings.

12. A combination according to claim 11 and including a circuit for integrating said voltage pulses to produce a direct current voltage which varies in amplitude in accordance with the average length of the scanning path traversing said markings.

13. A combination according to claim 12 and including reversible lateral-register adjusting means, and means controlled by said direct current voltage for operating said register adjusting means in one direction or the other when said direct current voltage varies in one direction or the other from a certain selected value.

14. A combination according to claim 11 wherein each register marking is formed of two marking lines defining the leading and lagging edges respectively of a tapered area of said web.

15. A combination according to claim 11 wherein each register marking is formed of a single mark covering a tapered area of said web.

References Cited in the file of this patent

FOREIGN PATENTS 641,830    Great Britain ___________ Aug. 23, 1950